INVENTORS
BERNARD LEVINE
FREDERICK B. MacLAREN

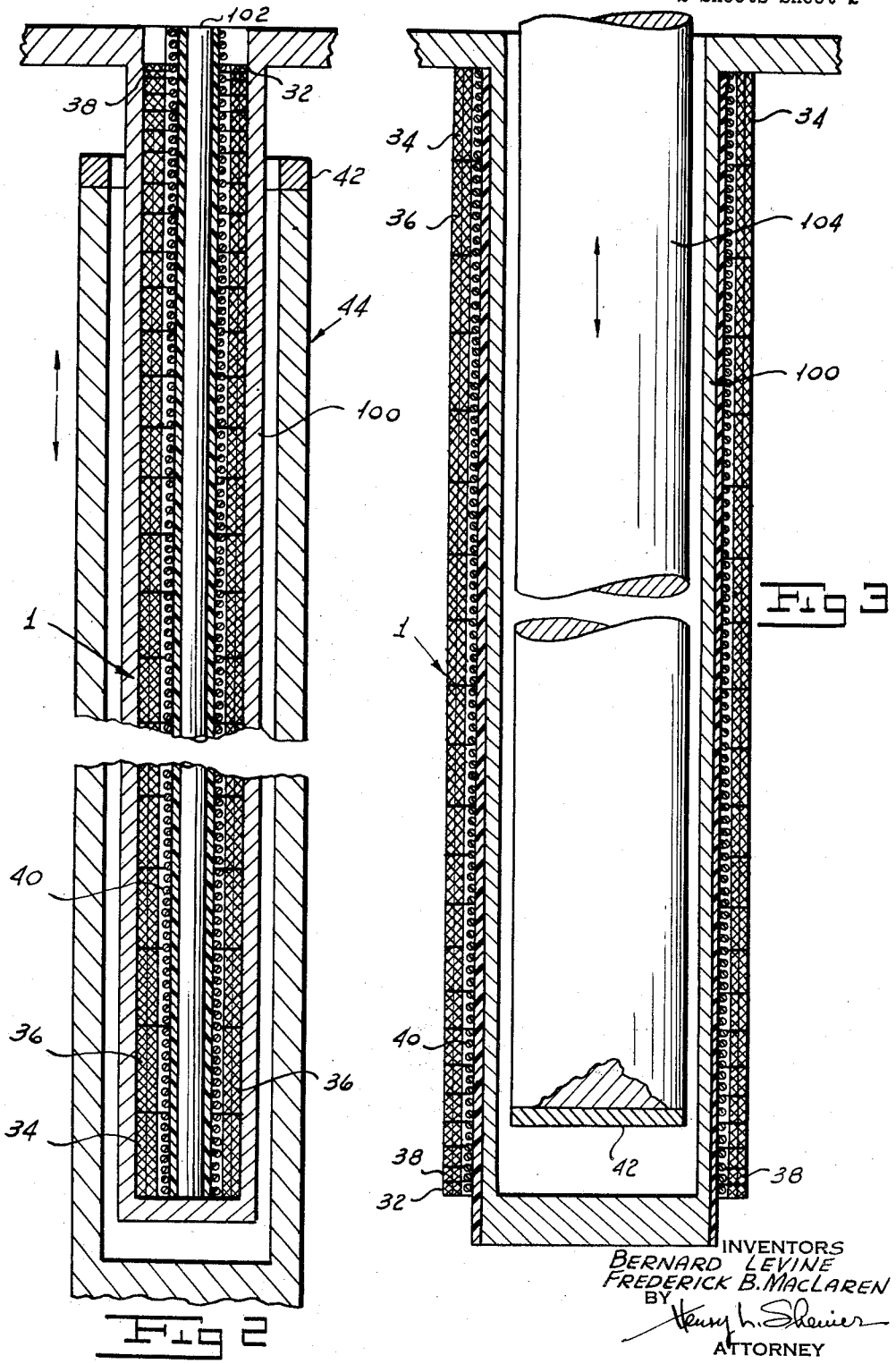

United States Patent Office 2,911,632
Patented Nov. 3, 1959

2,911,632

TELEMETRIC POSITION TRANSMITTER

Bernard Levine, Malverne, and Frederick B. MacLaren, New York, N.Y., assignors, by mesne assignments, to United Aircraft Corporation, East Hartford, Conn., a corporation of Delaware Application May 3, 1955, Serial No. 505,668

11 Claims. (Cl. 340—195)

Our invention relates to a telemetric position transmitter and more particularly to a device for indicating the position of a remote or inaccessible variable positionable means in a simple, convenient, accurate and reliable manner.

Telemetric devices and systems are well known to the art. Most of them are cumbersome, expensive and inaccurate, largely because they depend upon measuring absolute voltages as a function of distance. Voltage control devices are frequently expensive to manufacture, difficult to maintain and unreliable in operation.

One object of our invention is to provide a sensing means or transmitter which will indicate the position of a device at a location remote from that occupied by the device which is accurate in operation and simple in construction.

Another object of our invention is to provide a telemetric position transmitter which requires no voltage regulator owing to the fact that it is insensitive to variations in line voltage.

A further object of our invention is to provide an alternating current telemetric transmitter which will maintain its accuracy irrespective of changes in frequency.

A further object of our invention is to provide a telemetric position transmitter which may be placed either within or without a pressure wall and which will sense on the unpressured side of a pressure wall changes in position of means inside the pressure wall.

Other and further objects of our invention will appear from the following description.

In general, our invention contemplates the provision of a linearly moving magnetic field positioned along the locus of the movement of the device whose position is to be sensed or measured. The field is created by polyphase windings formed of a plurality of field coils. The coil widths and spacing are such that a moving magnetic field will be produced whose field strength changes uniformly from one end of the winding to the other. Adjacent the field we provide a screening or search coil adapted to be cut by lines of magnetic force of the moving field. Ordinarily, the voltage generated across the search coil will integrate to zero. To the means whose position is to be sensed, we attach a piece of high permeability material adapted to concentrate the flux from the magnetic field at the position occupied by the magnetic material. If desired, we may position a short-circuited turn to the means whose position is to be sensed in order to produce a discontinuous point in the magnetic field, either by increasing or decreasing the flux density or shifting its phase at this point. In this manner we produce a voltage change in the search coil. We are thus enabled to produce a voltage in the screening coil which is a function of the position of a magnetic linking material along the locus of its movement. Where the poles are relatively close to each other, the voltage produced will be relatively low as compared to the position where the poles are spaced farther apart where the voltage induced will be relatively high. The voltage is measured and calibrated as a function of distance.

In the accompanying drawings which form part of the instant specification and which are to be read in conjunction therewith and in which like reference numerals are used to indicate like parts in the various views:

Figure 2 is a cross-sectional view of a telemetric transmitter constructed to sense within a pressure wall the movement of a means outside a pressure wall.

Figure 3 is a view similar to Figure 2 showing our telemetric transmitter positioned outside of a pressure wall, arranged to detect the movement of a device inside a pressure wall.

Figure 1:
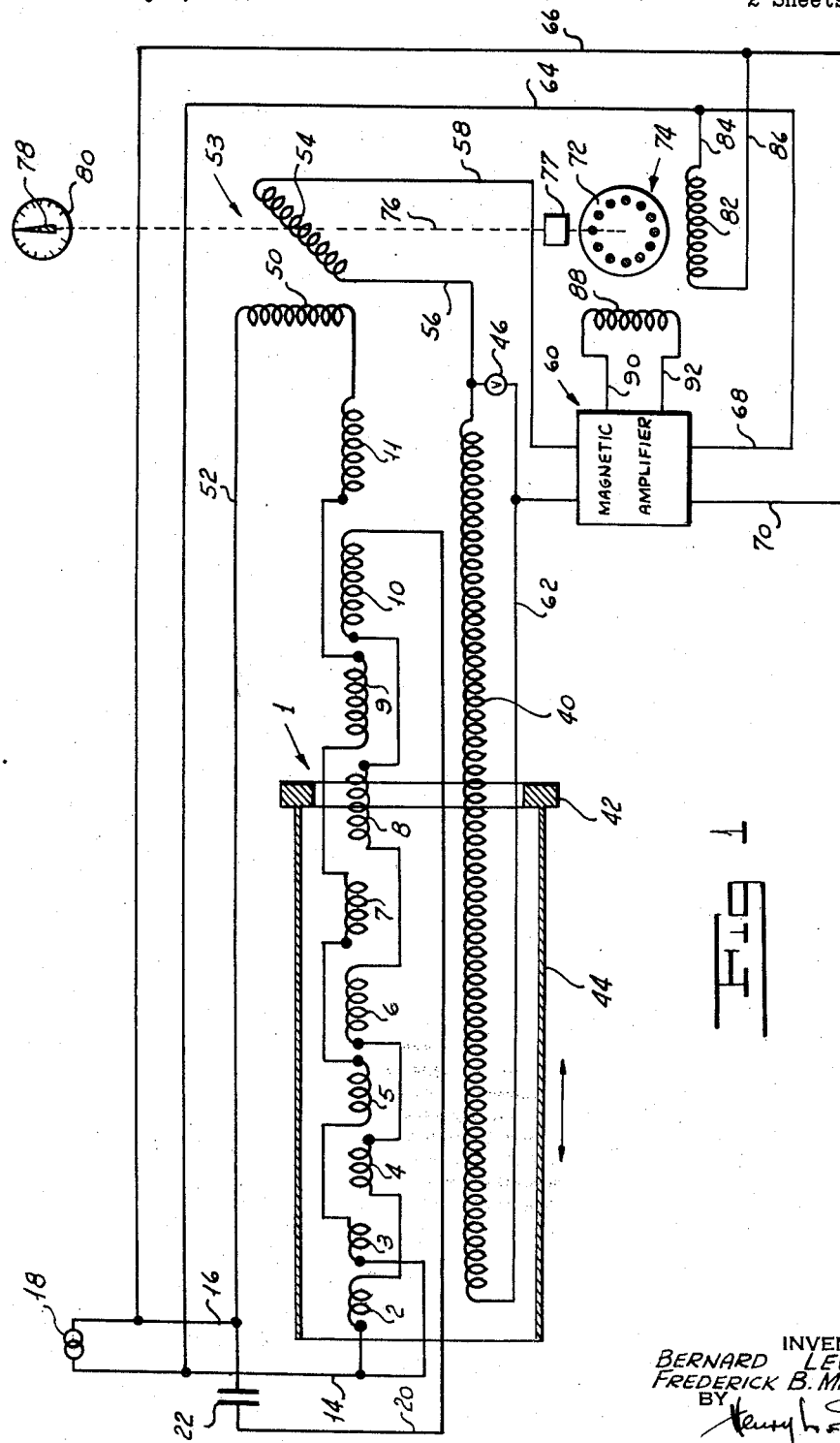
Figure 1 is a diagrammatic view of a telemetric system containing one embodiment of our invention.

More particularly referring now to Figure 1, we provide a plurality of field coils of a polyphase winding. The coils 2, 4, 6, 8 and 10 are alternately wound and connected in series. The arrangement of this winding is such that if the polarity of the field of winding 2 created by an exciting current were north, the polarity of winding 4 would be south, the polarity of winding 6 would be north, the polarity of winding 8 would be south and the polarity of winding 10 would be north. The second set of coils of the two-phase field winding, indicated generally by the reference numeral 1, comprises coils 3, 5, 7, 9 and 11. This set of coils is wound similar to the first set of coils; that is to say, coil 3 is similar to coil 2, coil 5 is similar to coil 4, coil 7 is similar to coil 6, coil 9 is similar to coil 8 and coil 11 is similar to coil 10. It is to be understood that, while we have shown a two-phase winding, a three-phase or any other appropriate polyphase winding may be employed. If this winding were on a conventional induction motor stator, it would produce a rotating magnetic field. The winding, however, is linearly disposed along the locus of movement of the device whose position is to be sensed. The set of coils 3, 5, 7, 9 and 11 are connected across conductors 14 and 16, which are supplied with an alternating potential from an alternator 18. The voltage impressed across coils 2, 4, 6, 8 and 10 from conductors 20 and 14 is phase shifted ninety degrees by capacitor 22, or by other suitable phase-shifting means. It is to be understood, of course, that, if desired, two alternators may be employed, whose voltages are ninety degrees apart, to excite the two-phase winding 1. If a three-phase winding is used, it will be understood that any appropriate three-phase potential source may be employed to excite the field windings.

The coils are of varying width, as can readily be seen by reference to Figures 2 and 3. In these views, the set of coils 32 at one end of the winding is much narrower than the set of coils 34 at the other end of the field winding. The field windings define the poles along which the magnetic field travels. The field will traverse a distance from pole to pole in precisely the same increment of time, depending on the frequency of the exciting current. The effect of the varying width of the sets of coils is to vary the interpole spacing or pole pitch. The varying pole pitch produces a field whose strength will vary as a function of linear position along the field. Referring now to Figures 2 and 3, it will be seen that the set of windings 34 which represents a pair of windings, such as coils 10 and 11, is spaced a distance from a set of adjacent windings 36 which is much greater than the distance between the set of windings 32 and the adjacent set of windings 38.

As has been explained hereinabove, the field strength varies along the over-all length of the winding made up of coils 1 to 11. This may be explained in the following manner. As is known in the art, the field strength H of a uniformly wound solenoid having a length $l$, a diameter $d$, and a number of turns $n$ per unit length may be expressed by the relationship (1) $$H = \frac{4\pi n I l}{\sqrt{l^2 + d^2}}$$

where I is the current passing through the solenoid winding. If $l$ is small with respect to $d$, as is the case with our individual coils as shown in the drawings, Equation 1 may be written as (2) $$H = \frac{4nIl}{d}$$

If $n$, I, and $d$ all are constants, field strength is directly proportional to length. From the foregoing it will be seen that the field strength of the coils of each set of coils making up our winding, increases along the overall length of the total winding in a direction from the set of coils 32 to the set of coils 34.

It will be seen that the over-all winding including all the coils 2 to 11 includes a group of coils 2, 4, 6, 8, and 10 separated in space phase by ninety degrees from the group of coils 3, 5, 7, 9, and 11. If these groups of coils both were energized from a single phase source, possible ambiguities would result since the resulting field strength envelope would pass through zero at points along the length of the winding including all the coils. To avoid this result, we apply two electrical signals having a time phase difference of ninety degrees to the respective groups of coils in a manner to be described hereinafter. The result of this action is a continuous field strength envelope which varies linearly along the length of the over-all winding.

To accomplish this measuring of the strength of the field, we provide a screening or search coil 40 positioned adjacent the synchronous field windings. Ordinarily, the integral of the voltages generated in the search coil 40 by the moving magnetic field along the search coil will integrate to zero. We attach a member 42 formed of high permeability material by any appropriate nonmagnetic means 44 to the device whose position is to be measured. For example, the search coil 40 may represent an elevator shaft of a building. The high permeability material member 42 may be attached by member 44 to a screw which is driven from the hoisting machine which moves the elevator car (not shown since it is well known to the art). In this manner the position of the member 42 will indicate the position of the car. The member 42 is positioned so as to concentrate flux from the field coils in the search or screening coil 40. In this manner, the field adjacent the magnetic material will be stronger than at any other part of the field windings and a voltage will be induced in that part of the search coil adjacent the magnetic material. It will be clear that a voltage will be produced which is a function of the position of the member 42 which is attached to the device whose position is to be sensed or measured. It is not necessary that the field strength variation with length be uniform since the measuring or metering device can be calibrated linearly. For example, a voltmeter 46 may be connected across the search coil 40 and calibrated as a function of distance. Ordinarily, the accuracy of calibration will be sufficient for many purposes.

In order to measure the position of the permeable member 42 more accurately, a winding 50 of an induction potentiometer, indicated generally by the reference numeral 53, has one of its terminals connected to a terminal of alternator 18 by conductors 16 and 52 and has its other terminal connected to the terminal of coil 11 which is remote from that terminal of coil 11 which is connected to coil 9. The winding 50 is adapted to be inductively coupled with the rotatably mounted winding 54 of the potentiometer 53 to produce a voltage which is a function of the angle between winding 54 and winding 50. One terminal of winding 54 is connected by conductor 56 to one terminal of screening winding 40. The other terminal of winding 54 is connected by conductor 58 to one terminal of the input of a magnetic amplifier, indicated generally by the reference numeral 60. The other terminal of the screening winding 40 is connected by conductor 62 to the other terminal of the input to the magnetic amplifier. It will be seen that the algebraic sum of the voltages across screening coil and across rotatable coil 54 constitute the control input to the magnetic amplifier. The magnetic amplifier is supplied with an alternating potential from the alternator 18 through conductors 64 and 66 and conductors 68 and 70, as can readily be seen by reference to Figure 1. The rotor 72 of a two-phase motor, indicated generally by the reference numeral 74, is mechanically connected by a shaft 76 to drive both the rotating coil 54 and the pointer 78 of a metering dial 80. It will readily be understood that a gear box 77 may be positioned between the motor rotor 72 and the shaft 76. One field winding 82 of the two-phase motor is excited from the alternator through conductors 84 and 86 connected to conductors 64 and 66. The output of the magnetic amplifier represents the algebraic sum of the opposing voltages in rotatable coil 54 and screening coil 40. This is impressed across the other field winding 88 of the two-phase synchronous motor 74 by means of conductors 90 and 92. It will be understood, of course, that the phase of the current in winding 88 is shifted ninety degrees from the phase of the current in winding 82. It will be observed, furthermore, that as long as there is a signal output from the magnetic amplifier, the two-phase motor will rotate in one direction or the other, depending upon the direction of the signal. The arrangement is such that the rotation of the rotor 72 of the two-phase motor will rotate the rotatable coil 54 to bring the signal to zero, thus driving the pointer 78 around the dial 80. The dial 80 is, of course, calibrated as a function of the position of the permeable member 42.

It will be appreciated by those skilled in the art that our telemetric system is insensitive to variations either in the voltage produced by the alternator 18 or its frequency. This follows from the fact that the potentiometer coil 50 is excited by the same potential source as are the field windings 1. Differences in line voltage and differences in frequency will be cancelled out owing to the fact that the two-phase motor is likewise excited from the same voltage source. It will also be observed that our design is quite simple in that no expensive vacuum tubes or choppers are used. Any appropriate power source, such as a 110-volt, 60-cycle alternating current line may be employed. Even though the frequency may vary plus or minus five percent and the voltage vary plus or minus ten percent, accurate results will be produced from our system.

Owing to the magnetic linking between the field coils and the search coil, the highly permeable material may be placed inside or outside of a pressure wall. Referring now to Figure 2, the screening or search coil 40 and the field windings 1 are positioned inside of a pressurized tube or vessel 100. If desired, the search coil may be positioned about a core of magnetic material 102 which will provide a more convenient return magnetic path for the magnetic flux. The member 42 of highly permeable material is attached to a nonmagnetic member 44 which surrounds the pressure wall 100.

Referring now to Figure 3, the field windings 1 and the search coil 40 are positioned around the outside of a pressurized vessel or pressure wall 100. In this form of the invention, it is desired to sense the position of a member 104 within the pressurized wall 100. In this case the member 104 carries the member of highly permeable material 42 inside of the pressurized wall 100.

In operation, as the member whose position is to be sensed moves, it will carry the highly permeable member 42 back and forth along the linearly moving magnetic field, thus coupling the magnetic flux from the field windings adjacent the permeable member with the search windings and inducing a voltage in the search windings as a function of the position of the highly permeable material. The voltage induced is proportional to field strength and the field speed. This voltage will vary, depending upon its position, owing to the fact that the pole pitch of the field windings progressively varies along the field. The voltage induced across search coil 40 is opposed by the voltage induced in the rotating coil 54 of the potentiometer 53. The algebraic sum of these voltages constitutes the input signal to the magnetic amplifier. It is to be understood, of course, that any other appropriate amplifier may be used, if desired. The output of the magnetic amplifier is impressed across one winding of the field of the two-phase motor 74. The arrangement is such that the two-phase motor will drive the rotating coil 54 and reduce the input to the magnetic amplifier to zero. At the zero point, the pointer 78 will measure the linear position of the member 42 upon the dial.

It will be seen that we have accomplished the objects of our invention. We have provided a sensing means or transmitter which will indicate the position of a device at a location remote from that occupied by the device which is accurate in operation and simple in construction. Our telemetric position indicator requires no voltage regulator owing to the fact that it is insensitive to variations in line voltage. The accuracy of our telemetric position transmitter does not vary with changes in frequency of the line current. The construction of our telemetric position transmitter is such that it may be placed either within or without a pressure wall and will sense on the unpressured side of the pressure wall changes in position of means inside of the pressure wall.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A telemetric position transmitter including in combination a polyphase field winding having a plurality of coils adapted to define magnetic poles when the winding is energized, the winding width of said coils varying progressively from one terminal of the field winding to the other to provide a varying pole pitch whereby the moving magnetic field created by the polyphase winding when energized has a strength which varies progressively along the length of said field winding, a search coil positioned adjacent to and substantially coextensive with said field winding, a movable flux varying member locally positioned adjacent said search coil adapted to vary magnetic flux from said field winding in said search coil in a small predetermined area and means for moving said flux varying member.

2. A telemetric position transmitter as in claim 1 in which said polyphase field winding comprises two sets of coils at each pole position.

3. A telemetric position transmitter as in claim 1 in which said means for moving the flux varying member is connected to an object whose position is to be sensed.

4. A telemetric position transmitter as in claim 1 including a voltmeter connected across said search coil.

5. A telemetric position transmitter including in combination a polyphase field winding having a plurality of coils adapted to define magnetic poles when the winding is energized, a source of polyphase alternating potential for energizing said field winding, the winding width of the coils of said field varying progressively from one terminal of the field winding to the other to provide a varying pole pitch whereby the moving magnetic field created by the energization of the polyphase winding has a strength which varies progressively along the length of said field winding, a search coil positioned adjacent to and substantially coextensive with the field winding, a movable highly permeable member locally positioned adjacent said search coil adapted to concentrate magnetic flux from the field winding in the search coil in a small predetermined area, a potentiometer having a stationary coil and a rotating coil, means for energizing said potentiometer stationary coil from one of the phases of said polyphase alternating potential, circuit means for algebraically summing the potentials generated in said potentiometer rotating coil and in said search coil, means for controlling a synchronous motor from the sum of said potentials and means responsive to the output of said synchronous motor for rotating said potentiometer rotatable coil to a position to bring said potential sum to zero.

6. A telemetric position transmitter as in claim 5 in which said synchronous motor is a two-phase motor and means for energizing one phase of the field winding of said motor from one phase of said alternating polyphase potential.

7. A telemetric position transmitter as in claim 5 in which said potential sum is amplified.

8. A telemetric position transmitter as in claim 5 including in combination means responsive to the rotation of said potentiometer rotatable coil for indicating the position of said highly permeable member.

9. A telemetric position transmitter including in combination a linearly extending polyphase field winding having a plurality of coils adapted to define magnetic poles when the winding is energized, the winding width of said coils varying progressively from one terminal of the field winding to the other to provide a varying pole pitch whereby the moving magnetic field created by the polyphase winding when energized has a strength which linearly and progressively varies along the length of the field winding, a search coil positioned adjacent to and substantially coextensive with said field winding, a movable flux varying member locally positioned adjacent said search coil adapted to vary magnetic flux from the field winding in a small predetermined area of the search coil whereby to induce a voltage in said search coil as a function of the linear position of said flux varying member along said field winding, means for balancing the potential induced in said search coil and means responsive to said balancing means for indicating the linear position of said movable flux varying member.

10. A telemetric position transmitter as in claim 9 in which said flux varying member comprises an element formed of highly permeable material.

11. A telemetric position transmitter as in claim 9 in which said flux varying member comprises a short-circuited turn formed of conducting material.

References Cited in the file of this patent

UNITED STATES PATENTS 2,569,106     James  ---------------- Sept. 25, 1951